(12) United States Patent
Kubota et al.

(10) Patent No.: US 7,340,764 B2
(45) Date of Patent: Mar. 4, 2008

(54) DATA TRANSMISSION SYSTEM

(75) Inventors: Ichiro Kubota, Kanagawa (JP); Shigeki Kamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 1236 days.

(21) Appl. No.: 09/937,461

(22) PCT Filed: Jan. 26, 2001

(86) PCT No.: PCT/JP01/00536

§ 371 (c)(1),
(2), (4) Date: Feb. 1, 2002

(87) PCT Pub. No.: WO01/56244

PCT Pub. Date: Aug. 2, 2001

(65) Prior Publication Data

US 2002/0154703 A1    Oct. 24, 2002

(30) Foreign Application Priority Data

Jan. 26, 2000  (JP) ................. P2000-016810

(51) Int. Cl.
*H04N 7/173* (2006.01)
(52) U.S. Cl. ................. 725/90; 725/93; 725/96; 725/115; 725/116; 370/468; 375/240; 709/223
(58) Field of Classification Search .............. 725/25, 725/86–104, 114–116, 118, 146; 370/468, 370/477, 532–540; 209/217–223; 375/240–253
See application file for complete search history.

(56) References Cited

U.S. PATENT DOCUMENTS

| | | | | |
|---|---|---|---|---|
| 5,617,541 A | * | 4/1997 | Albanese et al. | 709/207 |
| 5,790,176 A | * | 8/1998 | Craig | 725/115 |
| 5,831,662 A | * | 11/1998 | Payton | 725/122 |
| 5,875,303 A | * | 2/1999 | Huizer et al. | 709/231 |
| 5,918,017 A | * | 6/1999 | Attanasio et al. | 709/224 |
| 6,061,398 A | * | 5/2000 | Satoh et al. | 375/240 |
| 6,157,948 A | * | 12/2000 | Inoue et al. | 709/219 |
| 6,172,988 B1 | * | 1/2001 | Tiernan et al. | 370/473 |
| 6,195,680 B1 | * | 2/2001 | Goldszmidt et al. | 709/203 |
| 6,330,603 B1 | * | 12/2001 | Seki et al. | 709/226 |
| 6,438,140 B1 | * | 8/2002 | Jungers et al. | 370/471 |
| 6,493,356 B1 | * | 12/2002 | Aramizu et al. | 370/474 |
| 6,496,980 B1 | * | 12/2002 | Tillman et al. | 725/90 |
| 6,661,467 B1 | * | 12/2003 | Van Der Meer et al. | 348/564 |
| 6,788,882 B1 | * | 9/2004 | Geer et al. | 386/116 |

(Continued)

*Primary Examiner*—Annan Q. Shang
(74) *Attorney, Agent, or Firm*—Frommer Lawrence & Haug LLP; William S. Frommer; Thomas F. Presson

(57) ABSTRACT

A transmission control unit (12) of a transmitting station (10) specifies usable plural transmission paths (20). A data supply unit (11) transfers movie contents file encoded by MPEG 4 to plural divisional distribution encoders (13) corresponding to the specified plural transmission paths (20). The respective divisional distribution encoders (13) divide movie contents file into plural divisional distribution data in which original data file can be restored by carrying out synthesis. Further, the transmitting station (10) transmits divided respective divisional distribution data through transmission paths different from each other. Respective receiving units (31) of a receiving station (30) respectively receive divisional distribution data from the plural transmission paths (20). A linking decoder (32) synthesizes plural divisional distribution data to restore original movie contents file. Thus, high speed transfer of contents file of large capacity can be carried out.

18 Claims, 6 Drawing Sheets

U.S. PATENT DOCUMENTS 6,973,662 B1 * 12/2005 Sie et al. ...................... 725/25
7,016,951 B1 * 3/2006 Longworth et al. ......... 709/224
7,020,195 B1 * 3/2006 McMahon ............. 375/240.11

* cited by examiner

DATA TRANSMISSION SYSTEM

TECHNICAL FIELD

This invention relates to a data transmission system, a data transmitting apparatus, a data receiving apparatus and a data transmission method for transmitting data files of large capacity through a satellite wave, a ground wave or a cable, etc., and, for example, relates to the data transmission system, the data transmitting apparatus, the data receiving apparatus and the data transmission method used in, e.g., multi-cast distribution or data transmission between relay stations, etc. of moving picture data of movie or television program, etc.

BACKGROUND ART

In recent years, cases where data delivery of large capacity file is required have been increased. For example, moving pictures (movie, video, television program, etc.) which could been only handled as analog data in the prior art are being digitized. In general, in the case where moving picture is digitized, capacity of file becomes very large. For this reason, in digital broadcasts such as typical television broadcast, etc., such digital data of large capacity are transmitted in compressed state. In the case of ordinary broadcast, the compression system such as MPEG2 or MPEG4 is used so that data quantity is compressed into one several tenth. Digital data compressed in this way are caused to undergo transmission through existing one transmission path, e.g., one transponder in the case of satellite.

However, in the conventional data delivery, there is the problem that it is difficult to carry out transfer of file of large capacity or relaying of video of high picture quality.

For example, in the case of carrying out business data delivery such as delivery of movie, etc., it is necessary to suppress degradation of picture quality by transmission as small as possible unlike typical television broadcast. For this reason, compression factor must be held down to value lower than that in the ordinary case. As a result, capacity of file to be subjected to transmission becomes very large.

For example, data capacity that one transponder can carry out transmission is about 30M bps. In order to carry out transmission of video of picture quality of HDTV (High Definition Television) of 2 hours in non-compressed manner, 66 hours are required. For this reason, it was impossible to respond to, e.g., needs to carry out transmission of file overnight.

In addition, also in data transmission of real time such that relaying of video is carried out, it is impossible to carry out transmission of data at such a transmission rate to exceed capacity of one transmission path. For this reason, it was impossible to respond to needs to deliver moving picture data while maintaining high picture quality.

DISCLOSURE OF THE INVENTION

An object of this invention is to provide a data transmission system, a data transmitting apparatus, a data receiving apparatus and a data transmission method adapted for transferring large capacity data in a short time.

Another object of this invention is to provide a data transmission system, a data transmitting apparatus, a data receiving apparatus and a data transmission method which can transfer moving picture data of high picture quality in a short time and can carry out relaying of moving picture of high picture quality in real time.

The data transmission system according to this invention comprises a data transmitting apparatus including data supply means for supplying the data, transmission control means for dividing the data supplied by the data supply means into a predetermined number of data files to distribute the divided divisional data files, and data transmitting means for transmitting each of the distributed divisional data files respectively through a predetermined transmission path, and a data receiving apparatus including data receiving means for receiving the divisional data files transmitted through the predetermined transmission paths, data receiving control means for restoring the received divisional data files into original data, and data output means for outputting the restored data.

In this data transmission system, the data transmitting unit delivers data to be distributed to divide the data thus delivered into a predetermined number of data files to generate divisional data files to respectively transmit respective divisional data files through predetermined transmission paths. Further, in this data transmission system, the data receiving unit receives divisional data files respectively transmitted through predetermined transmission paths to combine the respective received divisional data files to restore original data to output the restored data.

The data transmitting apparatus according to this invention comprises data supply means for supplying the data, transmission control means for dividing the data supplied by the data supply means into a predetermined number of data files to distribute the divided divisional data files, and data transmitting means for transmitting each of the distributed divisional data files respectively through a predetermined transmission path.

The data receiving apparatus according to this invention comprises data receiving means for receiving a plurality of divisional data files transmitted through the plural predetermined transmission paths, data receiving control means for restoring the plurality of the received divisional data files into original data, and data output means for outputting the restored data.

In this data receiving apparatus, such an approach is employed to receive divisional data files respectively transmitted through the predetermined transmission paths to combine the received respective divisional data files to restore original data to output the restored data.

The data transmission method according to this invention comprises the steps of inputting the predetermined data to divide the input data into a predetermined number of data files to generate divisional data files to transmit each of the divisional data files through a predetermined transmission path, and receiving each of the divisional data files transmitted through the predetermined transmission paths to restore the received divisional data files into original data to output the restored data.

In this data transmission method, such an approach is employed to input data to be distributed to divide the inputted data into a predetermined number of data files to generate divisional data files to respectively transmit respective divisional data files through predetermined transmission paths. Further, in this data transmission method, such an approach is employed to receive the divisional data files respectively transmitted through predetermined transmission paths to combine the received respective divisional data files to restore original data to output the restored data.

Further, the data transmission system according to this invention comprises data transmitting apparatus including data dividing means for dividing one moving picture data file into a plurality of divisional distribution data files which are restored to an original data file by synthesis, and data transmitting means for transmitting each of the divided divisional distribution data files to each of a plurality of transmission paths which are different from each other, and a data receiving apparatus including data receiving means for receiving the plural divisional distribution data files from the plurality of the different transmission paths, and restoring means for synthesizing the plurality of the received divisional distribution data files to restore one moving picture data file.

In this data transmission system, such an approach is employed to divide one moving picture data file into plural divisional distribution data files in which original data file can be restored by carrying out synthesis to transmit the divided divisional distribution data files to the plural transmission paths different from each other to receive the plural divisional distribution data files from the different plural transmission paths to synthesize the received plural divisional distribution data files to restore one moving picture data file.

The data transmitting apparatus according to this invention comprises data dividing means for dividing one moving picture data file into a plurality of divisional distribution data files which are restored to an original data file by synthesis, and data transmitting means for transmitting each of the divided divisional distribution data files to each of a plurality of transmission paths which are different from each other.

In this data transmitting apparatus, such an approach is employed to divide one moving picture data file into plural divisional distribution data files in which original data file can be restored by carrying out synthesis to transmit the divided respective divisional distribution data files to the plural transmission paths different from each other.

The data receiving apparatus according to this invention comprises data receiving means for receiving, from each of a plurality of transmission paths which are different from each other, a plurality of divisional distribution data files which are restored to an original data file by synthesis, and restoring means for synthesizing the plurality of received divisional distribution data files to restore one moving picture data file.

In this data receiving apparatus, such an approach is employed to receive, from different plural transmission paths, plural divisional distribution data files in which original data file can be restored by carrying out synthesis to synthesize the received plural divisional distribution data files to restore one moving picture data file.

The data transmission method according to this invention comprises the steps of dividing one movie contents file into a plurality of divisional distribution data files which are restored to an original data file by synthesis, transmitting each of the divided divisional distribution data files to a plurality of satellite transponders which are different from each other, receiving the plurality of divisional distribution data files from the different plural satellite transponders, and synthesizing the plurality of the received divisional distribution data files to restore one movie contents file.

In this data transmission method, such an approach is employed to divide one moving picture data file into plural divisional distribution data files in which original data file can be restored by carrying out synthesis to transmit the divided respective divisional distribution data files to plural transmission paths different from each other to receive the plural divisional distribution data files from the different plural transmission paths to synthesize the received plural divisional distribution data files to restore one moving picture data file.

BEST MODE FOR CARRYING OUT THE INVENTION

Explanation will now be given with reference to the attached drawings in connection with the best mode for carrying out this invention.

A moving picture transmission system according to the present invention is will be first described as a first embodiment of this invention.

Figure 1:
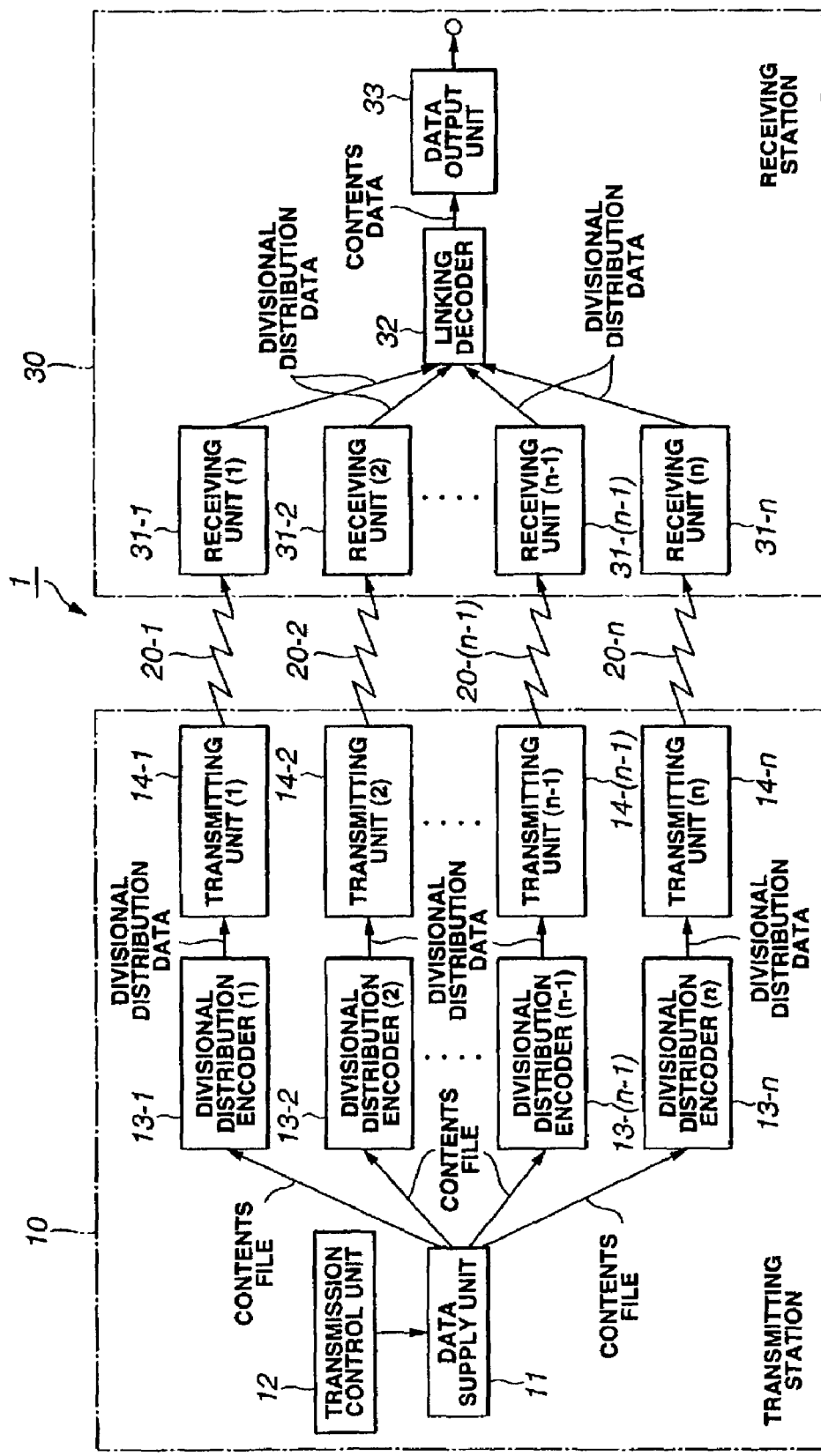
FIG. 1 is a view showing configuration of a moving picture transmission system which is a first embodiment of this invention.

The system configuration of moving picture transmission system 1 which will be explained as the first embodiment is shown in FIG. 1.

The moving picture transmission system 1 comprises a transmitting station 10 for transmitting moving picture data through predetermined transmission paths, plural transmissions paths 20-1 to 20-n, and a receiving station 30 for receiving moving picture data transmitted through the respective transmission paths 20-1 to 20-n. It is to be noted that while in the case where this moving picture transmission system 1 is applied to, e.g., transmission between relay stations, etc., the system is constituted by one transmitting station 10 and one receiving station 30, in the case where this moving picture transmission system 1 is applied to, e.g., multicast transmission, etc., the system is constituted by one transmitting station 10 and plural receiving stations 30.

The transmitting station 10 comprises a data supply unit 11, a transmission control unit 12, plural divisional distribution encoders 13-1 to 13-n, and plural transmitting units 14-1 to 14-n.

The data supply unit 11 digitizes moving picture contents such as movie or television program, etc. to further allow such digitized moving picture contents to be files to store them into storage unit. Moving picture contents files stored in the data supply unit 11 are data obtained by allowing moving picture contents data encoded by compression system, e.g., MPEG 4, etc. to be files. For example, in the case of movie contents of about 2 hours (e.g., contents in which picture size is 1920×1080 pixels), such contents data is encoded by using MPEG 4, whereby encoded moving picture contents data is stored into the data supply unit 11 as file of data size of hundred and several tens G bytes. It is to be noted that the data supply unit 11 not only stores one moving picture content as one contents file, but also may store, e.g., one moving picture content as plural contents files divided every predetermined time.

The data supply unit 11 selects contents file to be distributed from stored contents files to transfer the selected contents file to plural divisional distribution encoders 13-1 to 13-n in accordance with control of the transmission control unit 12. At this time, the transmission control unit 12 specifies plural transmission paths 20 which can be used at present from all transmission paths 20-1 to 20-n to select, as supply destinations of contents files, plural divisional distribution encoders 13 corresponding to the specified plural transmission paths 20. In this example, contents files delivered from the data supply unit 11 to respective divisional distribution encoders 13-1 to 13-n are all the same file. Namely, one contents file is transferred to the specified all divisional distribution encoders 13-1 to 13-n. In addition, in transfer of contents file from the data supply unit 11 to the divisional distribution encoders 13-1 to 13-n, e.g., Ethernet, etc. is used.

The respective divisional distribution encoders 13-1 to 13-n convert contents files which have been transferred into divisional distribution data. Such divisional distribution data are data in which original contents file can be restored by synthesizing plural divisional distribution data generated by the respective divisional distribution encoders 13-1 to 13-n. For example, data in which contents file is simply divided into plural blocks may be employed as divisional distribution data. In this case, the respective divisional distribution encoders 13-1 to 13-n output, as divisional distribution data, predetermined blocks generated by dividing contents file. At this time, the respective divisional distribution encoders 13-1 to 13-n respectively generate, as divisional distribution data, blocks of portions different from each other within the contents file. By employing such an approach, when respective divisional distribution data generated by the respective divisional distribution encoders 13-1 to 13-n are synthesized, it is possible to restore original contents file.

The detail of more practical example of this generation method for divisional distribution data will be described later.

The respective divisional distribution encoders 13-1 to 13-n respectively transfer respective generated divisional distribution data to corresponding transmitting units 14-1 to 14-n. In this case, in transfer of divisional distribution data from respective divisional distribution encoders 13-1 to 13-n to respective transmitting units 14-1 to 14-n, e.g., Ethernet, etc. is employed.

The respective transmitting units 14-1 to 14-n store transferred divisional distribution data and transmission control data in which information of transmission path used at respective times, etc. are included into private section of transport stream prescribed by, e.g., MPEG 2 systems to thereby carry out encoding. Moreover, the respective transmitting units 14-1 to 14-n further carry out transmission path encoding processing, modulation processing and frequency converting processing, etc. in accordance with the transmission system of the respective transmission paths 20 with respect to the generated transport stream to send out broadcast signals through corresponding transmission paths 20. For example, in the case where the transmission path 20 is satellite circuit, transmission path encoding processing, modulation processing and frequency converting processing, etc. in accordance with the DVB format or the ISDB-S format are carried out.

In this case, respective transmission paths 20-1 to 20-n corresponding to respective transmitting units 14-1 to 14-n are caused to be transmission paths different from each other. For example, in the case where respective transmission paths 20 are transmission path using satellite circuit, transponders different from each other are used. Moreover, in the case where one transponder carries out transmission of plural services by time divisional multiplexing, if those services are different, the same transponder may be used. In addition, not only the satellite circuit, but also transmission path between different media, such as, for example, ground wave broadcast, cable broadcast, etc. may be used.

The broadcast signals sent out from the transmitting station 10 in this way are distributed to the receiving station 30 through respective transmission paths 20-1 to 20-n.

The receiving station 30 comprises plural receiving units 31-1 to 31-n, a linking decoder 32 and a data output unit 33.

The respective receiving units 31-1 to 31-n receive broadcast signals distributed through the respective transmission paths 20-1 to 20-n. The receiving units 31-1 to 31-n carry out frequency converting processing, demodulation processing and transmission path decoding processing, etc. in accordance with systems of respective transmission paths with respect to received broadcast signals to decode transport stream. Further, the respective receiving units 31-1 to 31-n extract respective divisional distribution data from the private section of the decoded transport stream to transfer the respective divisional distribution data to the linking decoder 32. In this example, in transfer of divisional distribution data from respective receiving units 31-1 to 31-n to the linking decoder 32, e.g., Ethernet, etc. is used.

The linking decoder 32 links or combines plural divisional distribution data transferred from the respective receiving units 31-1 to 31-n to restore original contents file. For example, such an approach is employed to judge linking method, etc. on the basis of transmission control information to carry out restoring of contents file. The detail of an example of more practical restoring method for divisional distribution data will be described later. The linking decoder 32 transfers restored contents file to the data output unit 33. In this example, in transfer from the linking decoder 32 to the data output unit 33, e.g., Ethernet, etc. is used.

The data output unit 33 stores a contents file into a memory unit, e.g., as file archive, or carries out decoding processing based on the MPEG 4 format to carry out the reproduction of contents, etc.

As described above, in the moving picture transmission system 1 of the embodiment of this invention, such an approach is employed to convert one contents file into plural divisional distribution data to carry out transmission thereof through plural transmission paths different from each other. For this reason, as compared to the case where single transmission path is used to carry out transmission of contents file, transmission rate is improved in dependency upon the number of transmission paths used. For example, in the case where attempt is made to carry out transmission of movie contents of 2 hours compressed to transmission rate of 140 Mbps by using satellite broadcast, since one transponder only has transmission capacity of about 35 Mbps, it was impossible to carry out transmission at the same hour (2 hours) as the running time of movie so that it takes 8 hours. However, when this moving picture transmission system 1 is used, it is possible to carry out transmission at the same time of the running time of movie. For example, it is possible to deliver movie contents of 2 hours by using four transponders. In this case, it is possible to carry out transmission of movie contents at the same time (2 hours) as the running time of movie.

Explanation will now be given in connection with an example of divisional distribution data generated by the divisional distribution encoder 13 and an example of restoring method for a contents file by linking decoder 32.

In this moving picture transmission system 1, packet stream generated on the basis of packet transfer protocol described in, e.g., the International Application internationally published on the basis of Patent Cooperative. Treaty (PCT) (International Publication No. WO00/18017) may be used as divisional distribution data.

In the case where the method of generating packet stream described in the above publication (PCT International Publication No. WO00/18017) is utilized, respective divisional distribution encoders 13 generate divisional distribution data in a manner described below.

Figure 2:
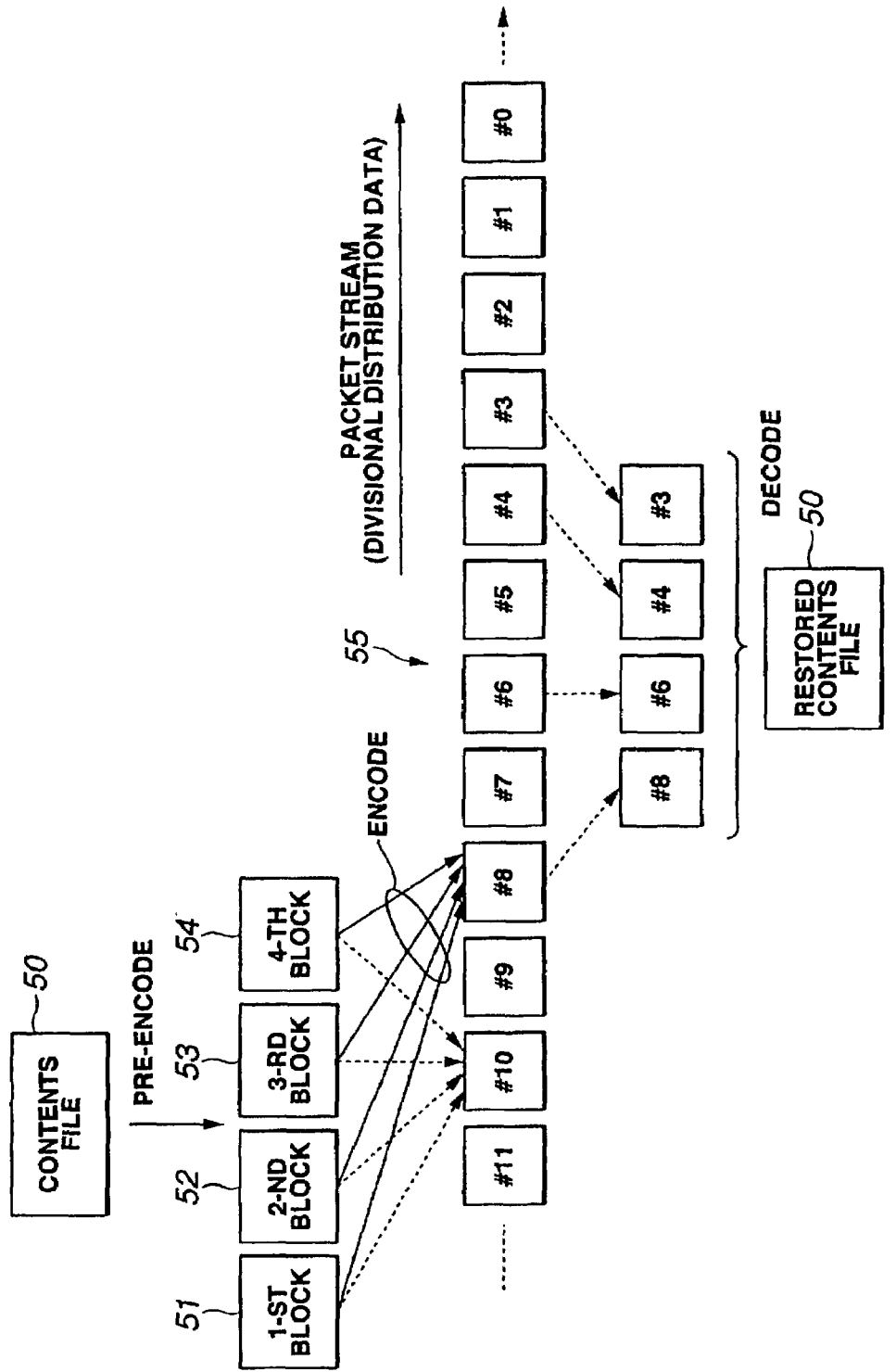
FIG. 2 is a view for explaining a method of generating divisional distribution data.

As shown in FIG. 2, respective divisional distribution encoders 13 divide one contents file 50 to carry out conversion into data of plural blocks (e.g., four blocks 51 to 54 from the first block to the fourth block).

Subsequently, the respective divisional distribution encoders 13 extract data from the divided all blocks and carry out a predetermined operation processing (encode processing) to thereby generate plural different packets. As this packet, $2^{32}$ different packets can be generated.

Further, the respective divisional distribution encoders 13 generate packet stream 55 in which different plural packets generated in a manner described above are arranged as packet train of time series to output that packet stream 55 as divisional distribution data.

In this case, the divisional distribution data generated as described above has the following feature. Namely, when a predetermined number of packets (e.g., four packets) are taken out from the group of $2^{32}$ packets generated by carrying out encoding to carry out a predetermined operation processing (decode processing) with respect to these predetermined numbers of packets, it is possible to restore the contents file 50. As combination of plural packets taken out from the group of packets, if the same packet is not included, any combination may be employed. For example, as shown in FIG. 2, packets of packet numbers #3, #4, #6, #8 may be extracted, thus making it possible to restore the contents file. In addition, even if other combination, e.g., combination of packet numbers #8, #140, #200, #209 is employed, it is possible to restore contents file. It is to be noted that the number of blocks generated by carrying out pre-encoding and the number of packets taken out from the group of packets are not limited to four.

Figure 3:
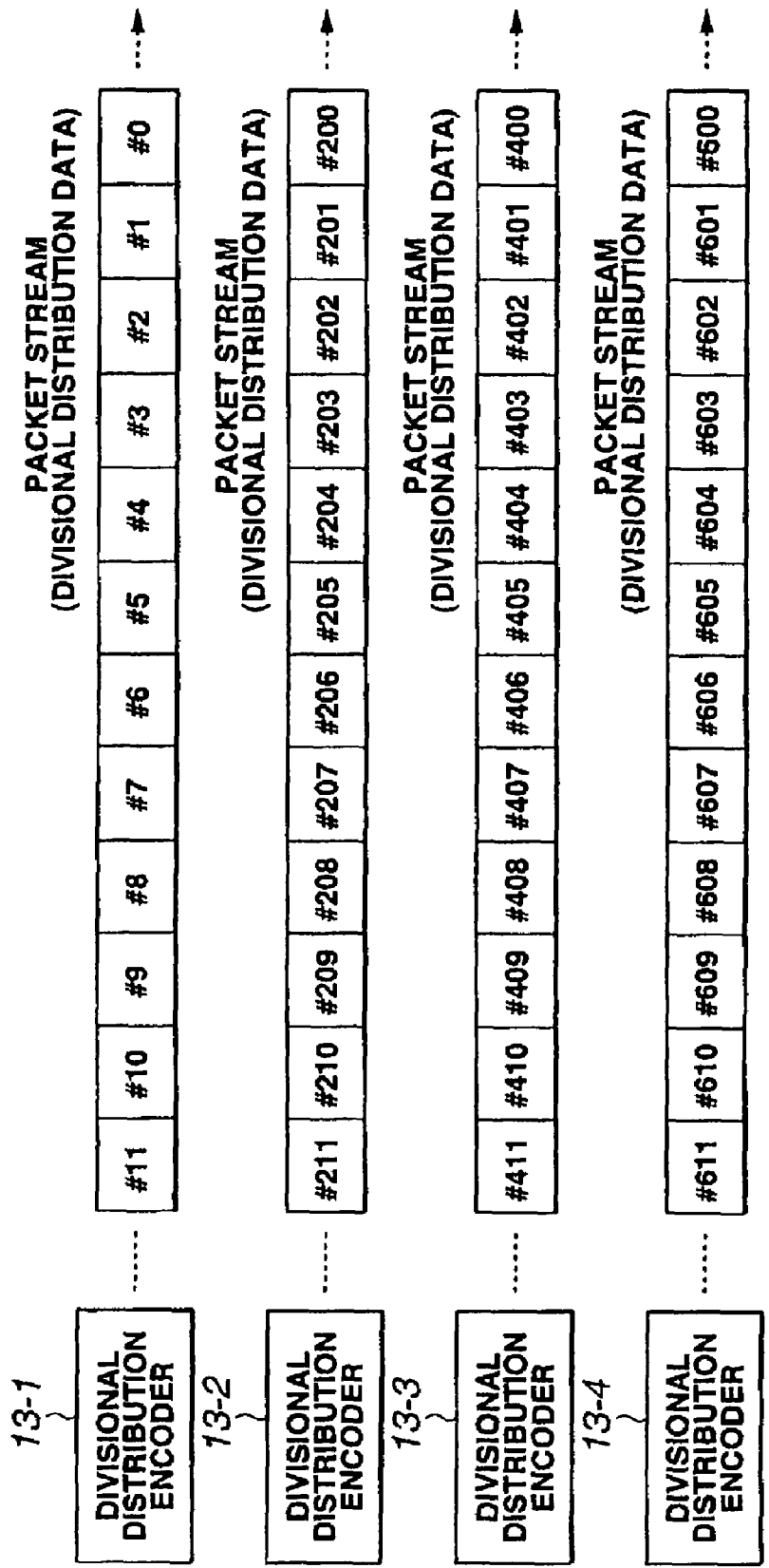
FIG. 3 is a view for explaining sending order of packet of divisional distribution data.

The respective divisional distribution encoders 13 respectively carry out the same operation (encode processing) with respect to the same contents files. Therefore, the groups of $2^{32}$ packets generated by the respective divisional distribution encoders 13 are the same. However, processing is carried out such that sending orders of packets to be outputted are caused to be different with respect to mutual divisional distribution encoders 13 and the same packet is not outputted at the same time. For example, in the case where four divisional distribution data are generated by four divisional distribution encoders 13 (13-1 to 13-4) as shown in FIG. 3, e.g., packet stream is outputted from packet No. #0 from the first divisional distribution encoder 13-1, packet stream is outputted from packet No. #200 from the second divisional distribution encoder 13-2, packet stream is outputted from packet No. #400 from the third divisional distribution encoder 13-3, and packet stream is outputted from packet No. #600 from the fourth divisional distribution encoder 13-4.

In the case where divisional distribution data is generated in a manner as described above, linking decoder 32 of the receiving station 30 carries out processing as described below to carry out restoring processing of contents file.

Figure 4:
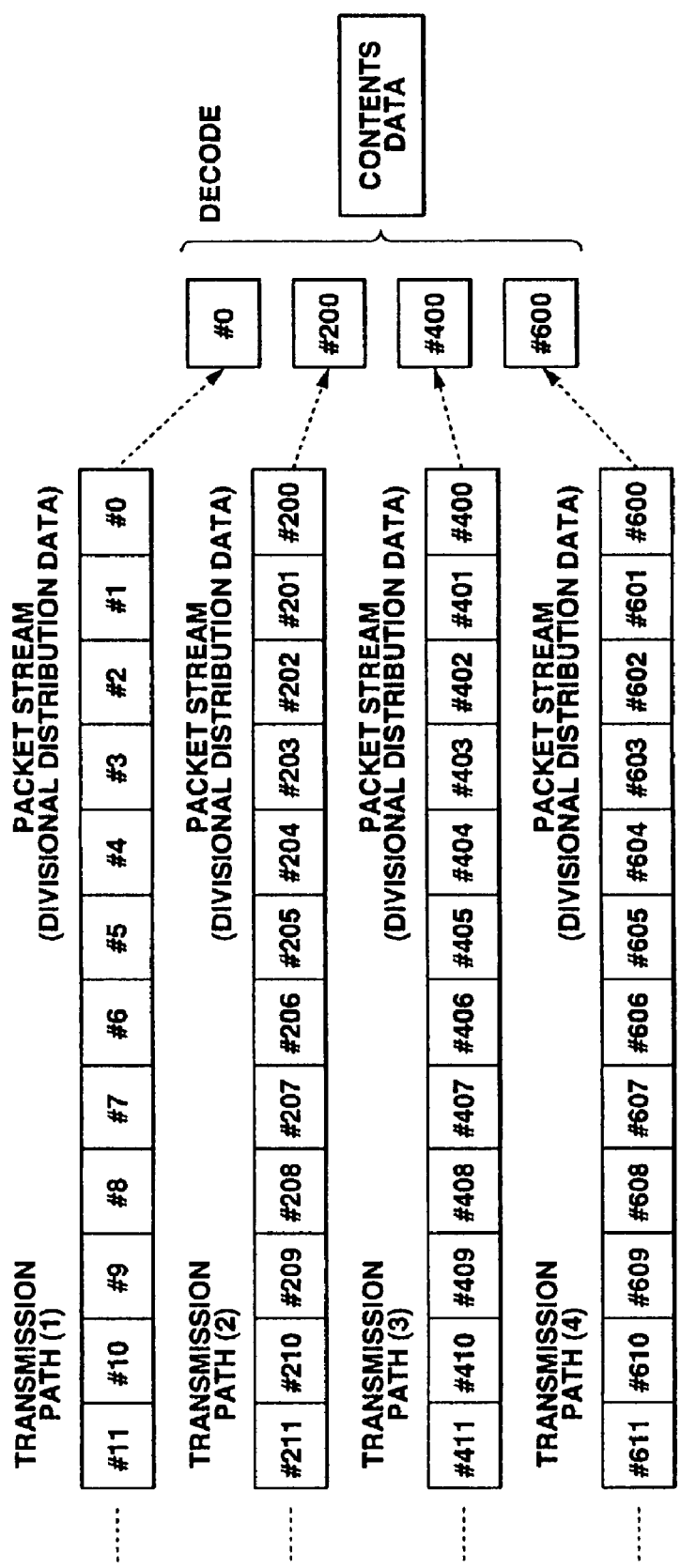
FIG. 4 is a view for explaining a method of decoding divisional distribution data.

Since plural divisional distribution data are received through plural different transmission paths at the receiving station 30 side, plural packet streams are inputted to the linking decoder 32 as shown in FIG. 4. For example, four packet streams are assumed to be inputted from four transmission paths.

In this case, the linking decoder 32 acquires packets respectively one by one from respective streams, thereby making it possible to extract a predetermined number of packets (e.g., 4 packets) necessary for restoring. For example, as shown in FIG. 3, packet No. #0 is acquired from the first transmission path, packet No. #200 is acquired from the second transmission path, packet No. #400 is acquired from the third transmission path and packet No. #600 is acquired from the fourth transmission path, thereby making it possible to acquire four packets.

Further, the linking decoder 32 carries out a predetermined operation processing (decode) with respect to plural packets taken out from respective streams in this way, thereby making it possible to restore the contents file.

In the moving picture transmission system 1, by generating the divisional distribution data as described above, it is possible to divide moving picture contents file subject to transmission into plural divisional distribution data which can be restored. For this reason, it becomes possible to transmit one contents file by using plural transmission paths. Further, when divisional distribution data are generated as described above, if plural arbitrary packets are taken out, it is possible to restore original contents file. For this reason, even if, e.g., transmitting state of a certain one transmission path becomes wrong so that reception cannot be carried out, it also becomes possible to take out instead packet transmitted from other transmission path to restore it. In addition, since acquisition start timing of packet is not limited, it becomes possible to carry out more flexible reception.

Explanation will now be given in connection with the data transmission system according to this invention as the second embodiment of this invention.

Figure 5:
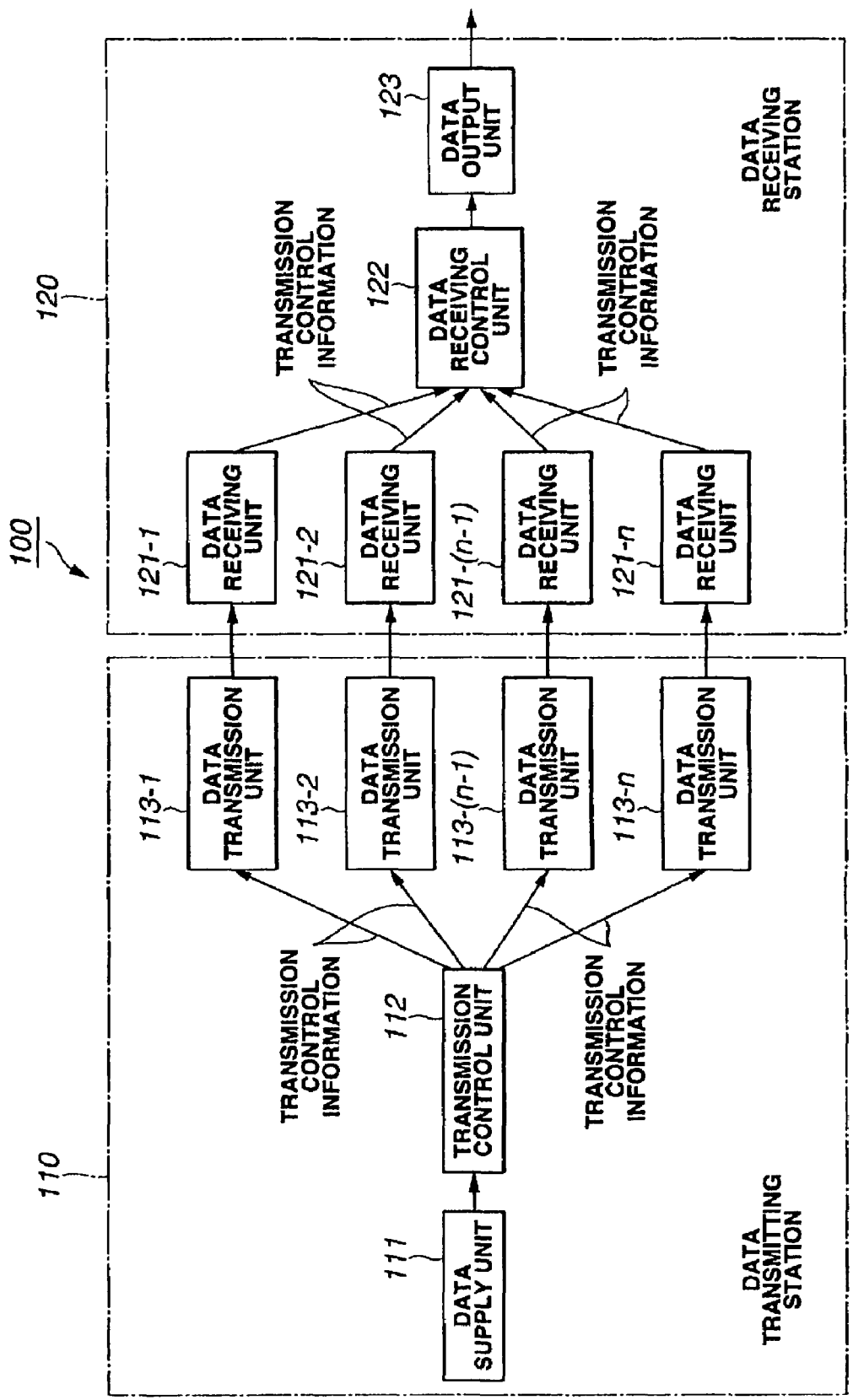
FIG. 5 is a view showing configuration of a data transmission system which is a second embodiment of this invention.

The system configuration of the data transmission system 100 which will be explained as the second embodiment is shown in FIG. 5.

The data transmission system of the second embodiment comprises a data transmitting station 110 which is a data transmitting apparatus and a data receiving station 120 which is a data receiving apparatus. In this data transmission system 100, the system may be constituted by one data transmitting station 110 and plural data receiving stations 120, or may be constituted by one data transmitting station 110 and one data receiving station 120.

The data transmitting station 110 comprises a data supply unit 111 serving as data supply means, a transmission control unit 112 serving as transmission control means, and data transmission units 113-1, 113-2 . . . , 113-n serving as data transmitting means.

The data supply unit 111 supplies data to be distributed to the transmission control unit 112. As supply of data, there are the case where data files generated in advance are stored into file storage unit to read out such data files from the file storage unit as occasion demands to supply them, the case where data generated in real time like video relaying of high picture quality are inputted as they are to deliver them, and the like. These data to be delivered are digital data of large capacity such as digitized video information, etc. The transmission control unit 112 divides data supplied from the data supply unit 111 into a predetermined number of data to distribute the divided divisional data files to the data transmission units 113-1 to 113-n. At this time, the transmission control unit 112 also carries out monitoring/management of transmission path such as acquisition of transmission path information which are states of respective transmission paths through the data transmissions units 113-1 to 113-n to grasp transmission paths which can be used at present to determine transmission path used, etc. Moreover, the transmission control unit 112 transfers, to data transmission units 113, transmission control information such as state of transmission path used at respective times. The data transmission units 113-1 to 113-n convert format of transferred divisional data files into format used in the connected transmission path to further carry out conversion along the method peculiar to the transmission path such as modulation, frequency conversion, etc. to carry out transmission. For example, in the case where transmission path is satellite circuit, the transmission control unit 112 converts its format into DVB format generally used in the satellite circuit to carry out transmission. The data transmission unit 113 converts format of transmission control information sent from the transmission control unit 112 into format suitable for the transmission path as control information channel to carry out transmission. This control information channel may be multiplexed with data caused to undergo transmission of other data transmission units 113-1 to 113-n to carry out transmission through transmission paths of the data transmission units 113-1 to 113-n.

The data receiving station 120 comprises data receiving units 121-1 to 121-n which are data receiving means, a data receiving control unit 122 which is data receiving control means, and a data output unit 123 which is data output means.

The data receiving units 121-1 to 121-n receive divisional data files transmitted from the data transmitting station 110 through transmission paths designated by the data receiving control units 122. Formats of divisional data files received from respective transmission paths are converted into original formats. The format converted divisional data files are transferred to the data receiving control unit 122. The data receiving units 121 receive transmission control information transmitted from the data transmitting station 110. Formats of the received transmission control information are converted into original formats. The format converted transmission control information are transferred to the data receiving control unit 122. The data receiving control unit 122 detects, on the basis of transmission control information, transmission path through which divisional data file is to be received to designate data of which transmission path is to be received with respect to respective data receiving units 121-1 to 121-n. For example, in the case where transmission path is satellite circuit, designation of whether or not data of which transponder is to be received is carried out. Further, the data receiving control unit 122 combines divisional data files acquired from the respective data receiving units 121-1 to 121-n to restore them into data of original form. For example, transmission control information is used to detect that original data is restored when which order of divisional data files acquired from data receiving units 121-1 to 121-n is made to carry out rearrangement on the basis of it to restore original data. The data output unit 123 outputs the restored data to a predetermined unit. For example, in the case where the predetermined unit is the memory unit, restored data is stored into the memory unit as file archive. In addition, in the case where the predetermined unit is network transmitting unit, restored data is sent out to the network.

The operation of data transmission system constituted in this way and the data transmission method will be described.

At the data transmitting station 110, simultaneously with data distribution start, data to be transmitted is transferred from the data supply unit 111 to the transmission control unit 112. In the case where data is data file generated in advance, the data supply unit 111 reads out data file temporarily stored in the file storage unit within the data supply unit 111 itself to output it to the transmission control unit 112. Moreover, in the case where data is data generated in real time, this data is inputted in real time to output it to the transmission control unit 112. The transmission control unit 112 determines transmission path which can be used to divide data in correspondence therewith to generate divisional data files to distribute the divisional data files to data transmission units 113-1 to 113-n. Further, the transmission control unit 112 transfers, to the data transmission units 113, information relating to transmission path used and/or transmission control information including arrangement order of divisional data files, etc. The data transmission units 113-1 to 113-n convert formats of transferred divisional data files or transmission control information into formats suitable for the transmission path to carry out transmission thereof. The data receiving station 120 receives transmission control information by the data receiving units 121 to return their formats to original formats thereafter to transfer the to the data receiving control unit 122. The data receiving control unit 122 detects transmission path to be received on the basis of the transmission control information to instruct respective data receiving units 121-n to 121-n to receive data of any one of transmissions paths. The data receiving units 121-1 to 121-n receive divisional data files from the instructed transmission paths. The divisional data files are transferred to the data receiving control unit 122 after converted into original format. The data receiving control unit 122 links divisional data files on the basis of transmission control information to restore them into form of original data. The restored data is outputted to a predetermined unit by the data output unit 123. In the case where the predetermined unit is the memory unit, restored data is stored into the memory unit as file archive. In addition, in the case where the predetermined unit is network transmitting unit, restored data is sent out to the network.

In general, in the case of distributing data files of large capacity generated in advance, the data transmitting station 110 stores data file into file storage unit therewithin to read out the stored data file by the data supply unit 111 to transmit data files in a divisional manner by the procedure of the explanation. The data receiving station 120 restores the divisional data files by the above-mentioned procedure of explanation to store the restored data file into file storage unit of the data receiving station 120 side by the data output means 230 thereafter to utilize it. In this way, files of large capacity can be distributed in a short time.

Moreover, in the case of distributing data of large capacity generated in real time like video relaying of high picture quality, the data transmitting station 110 inputs data generated in real-time by the data supply unit 111 to divide the data by the above-mentioned procedure of the explanation to transmit them. The data receiving station 120 restores the divisional data files by the above-mentioned procedure of the explanation to output the restored data to unit connected thereto in real time by the data output means 230. In the case where the unit to be connected is network transmitting unit, restored data is sent out to the network in real time to deliver data of real time to the network equipment connected. In the case where the unit to be connected is data reproducing unit, restored data is reproduced in real time. In a manner stated above, it becomes possible to distribute, in real time, data of large capacity generated in real time, e.g., at the time of high picture quality video relaying, etc.

As explained above, utilizable plural transmission paths which are empty at a certain time point are used to transfer data file which has been caused to undergo transmission by the single transmission path in the prior art, thereby making it possible to improve transmission rate which was restricted by capacity of single transmission path in the prior art. Since high speed data transfer can be carried out, not only transfer of file of large capacity can be carried out, but also high picture quality video relaying can be carried out.

Explanation will now be given in more detail in connection with generation of divisional data files. As a method of dividing data, there are a method of dividing data into blocks corresponding to the number of transmission paths and a method of distributing data to respective paths in units of frame caused to undergo transmission.

Figure 6:
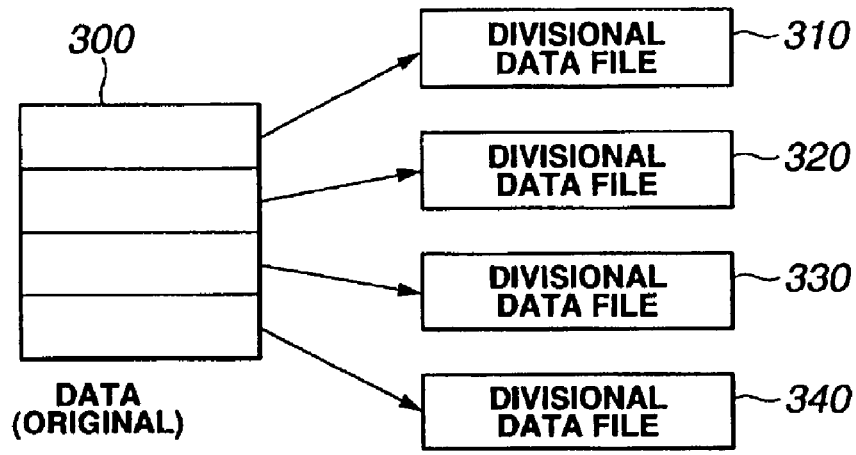
FIG. 6 is a view for explaining the example where data is divided in dependency upon the number of transmission paths.

The method of dividing first data in correspondence with the number of transmission paths will be described. FIG. 6 shows the example where data is divided depending upon the number of transmission paths.

The transmission control unit 112 of the data transmitting station 110 determines transmission path which can be used and inputs original data 300 from the data supply unit 111 to divide data in correspondence with the number of transmission paths which can be used, thus to generate divisional data files 310, 320, 330, 340. In this example, the number of transmission paths which can be used is four, and data 300 is quadrisected in correspondence therewith. The quadrisected divisional data files 310, 320, 330, 340 are respectively transferred to data transmission units. After undergone format conversion at the data transmission units, such data files are transmitted. At the receiving side, quadrisected divisional data files 310,320,330,340 are received by data receiving units connected to respective transmission paths to restore them into original data 300 at the data receiving control unit.

Figure 7:
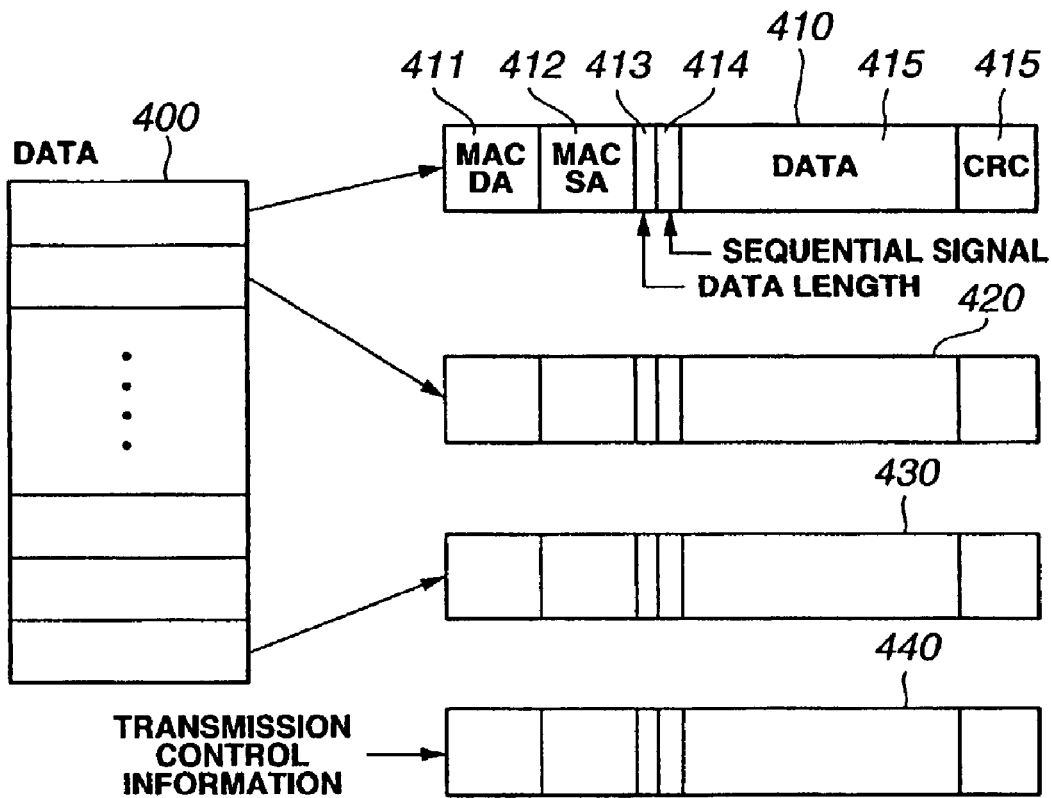
FIG. 7 is a view for explaining the example where data is distributed in frame units.

This method is applied to the case where transmission of large capacity file of which data size is known in advance is carried out. In addition; while it has been explained that data is equally divided with respect to transmission paths which can be used, size of divisional data to be divided may be changed, e.g., in dependency upon characteristic of data transfer rate of transmission path, etc The method of distributing second data in frame units will now be described. FIG. 7 shows the example where data is distributed in frame units.

The transmission control unit 112 of the data transmitting station 110 determines transmission paths which can be used and carries out transmission in correspondence with respective transmission paths in units of frame where transmission of data is carried out. Original data 400 is divided into blocks of specific data length. After sequential No. and data length are added to divided respective blocks, they are distributed to respective data transmission units. The data transmission units convert distributed blocks into data of a predetermined format to add MAC address, etc. thereafter to transfer such data as MAC frames 410,420,430 on the LAN. Explanation will be given by using MAC frame 410 in connection with the configuration of the MAC frames 410,420,430. The MAC frame 410 consists of data 415 which is data file area corresponding to the already explained divided block, sequential No. 414 and data length 413 of divisional data file, MAC address of destination (MAC DA) 411, MAC address of source (MAC SA) 412, and CRC 416. In addition, MAC frame 440 has a configuration similar to the above, wherein transmission control information is stored in the data file area.

The respective data transmission units 113 recognize numbers to be processed in advance by instruction from the transmission control unit 112 to process only MAC frames having corresponding sequential numbers. For example, it is assumed that there exist four transmission paths and four data transmission units corresponding thereto and respective transmission units are indicated as data transmission unit 113-1, data transmission unit 113-2,data transmission unit 113-3 and data transmission unit 113-4. When n is assumed to be the number of divided data frames of original data file 400/4, in the case where corresponding unit is data transmission unit 113-1, MAC frame of sequential No. 4N (N=0 to n)is processed. Similarly, the data transmission unit 113-2 processes MAC frame of sequential No.4N+1, the data transmission unit 113-3 processes MAC frame of sequential No. 4N+2, and the data transmission unit 113-4 processes MAC frame of sequential No. 4N+3. In this example, in the case where the number of all data frames is not multiple of 4, n is caused to be maximum integer which does not exceed the number of divided data frames of original data/4.

At the data receiving station 120, the data receiving units 121 receive respective MAC frames to convert MAC frames into data of original format thereafter to transfer such data to the data receiving control unit 122. The data receiving control unit 122 carries out the restoring of original data so that sequential number added to data frame becomes serial number.

This method can be applied not only to the case where transmission of large capacity file of which data size is known in advance is carried out but also to the case where data transfer is carried out in real time. For this reason, video relaying of high picture quality can be carried out.

It is to be noted that the above-mentioned processing functions can be realized by computer. In that case, processing content of function that the data transmission system should have is described in program recorded with respect to recording medium which can be read by computer. Further, by executing this program by computer, the above-mentioned processing is realized by computer. As recording media where data can be read by computer, there are magnetic recording device, semiconductor memory, and the like. In the case of circulation on the market, programs may be stored in portable recording medium such as CD-ROM (Compact Disc Read Only Memory) or floppy disc, etc. to circulate them, or programs may be stored in a memory unit of computer connected through network to transfer them to other computer through the network. In executing programs by computer, such an approach may be employed to store programs on hard disc unit, etc. within the computer to load such programs into main memory to execute them.

INDUSTRIAL APPLICABILITY

In the data transmission system, the data transmitting apparatus, the data receiving apparatus and the data transmission method according to this invention, at the data transmitting side, such an approach is employed to deliver data to be distributed to divide the delivered data into a predetermined number of data files to generate divisional data files to respectively transmit the respective divisional data files through predetermined transmission paths. Moreover, in this invention, at the data receiving side, such an approach is employed to respectively receive divisional data files transmitted through the predetermined transmission paths to link the received respective divisional data files to restore original data to output the restored data.

For this reason, in this invention, it is possible to carry out transmission of data by using plural transmissions paths. Accordingly, it is possible to transfer large capacity data in a short time.

Further, in the data transmission system, the data transmitting apparatus, the data receiving apparatus and the data transmission method according to this invention, such an approach is employed to divide one moving picture data file into plural divisional distribution data files in which original data file can be restored by carrying out synthesis to transmit the divided respective divisional distribution data files to transmission paths different from each other to receive the plural divisional distribution data files from the different plural transmission paths to synthesize the received plural divisional distribution data files to restore one moving picture data file.

For this reason, in this invention, transmission of moving picture data of high picture quality can be carried out, and moving picture relaying of high picture quality can be carried out in real time.

The invention claimed is:

1. A data transmission system for distributing predetermined data through transmission paths, the data transmission system comprising:
    a data transmitting apparatus including data supply means for supplying the data, transmission control means for dividing the data supplied by the data supply means into a predetermined number of data files to distribute the divided divisional data files, and data transmitting means for transmitting each of the distributed divisional data files respectively through a predetermined transmission path,
    wherein the data transmitting apparatus stores the distributed divisional data files in a private section of a respective transport stream; and
    a data receiving apparatus including data receiving means for receiving the divisional data files transmitted through the predetermined transmission paths, data receiving control means for restoring the received divisional data files into original data, and data output means for outputting the restored data,
    wherein the data receiving apparatus extracts the divisional data files from the private section of the transport stream; and
    wherein said divisional data files can be restored into original data when a predetermined number of packets are removed by said data receiving apparatus from a group of packets generated by said data transmitting apparatus.

2. The data transmission system as set forth in claim 1, wherein the data supply means stores data files generated in advance, to deliver the stored data files as occasion demands.

3. The data transmission system as set forth in claim 1, wherein the data supply means supplies data generated in real time.

4. The data transmission system as set forth in claim 1, wherein the transmission control means of the data transmitting apparatus divides the data into data files corresponding to a number of transmittable paths in advance, to distribute each of the divisional data files respectively to the data transmitting means connected to the transmittable paths.

5. The data transmission system as set forth in claim 1, wherein the transmission control means of the data transmitting apparatus divides the data in units of a predetermined transmission frame to distribute each of the divisional data files respectively to the data transmitting means.

6. The data transmission system as set forth in claim 1, wherein the data transmitting means of the data transmitting apparatus further detects a state as to whether the transmission path connected to the transmitting means can be used or not, and transmits the detected state serving as transmission path information to the transmission control means, and
    wherein the transmission control means of the data transmitting apparatus further collects the transmission path information to calculate a number of usable transmission paths to divide the data in correspondence the calculated number to distribute each of the divisional data files respectively to the usable data transmitting means.

7. The data transmission system as set forth in claim 1, wherein each of the transmission paths is formed by a plurality of transponders mounted in satellite.

8. A data transmitting apparatus for transmitting predetermined data through transmission paths, the data transmitting apparatus comprising:
    data supply means for supplying the data;
    transmission control means for dividing the data supplied by the data supply means into a predetermined number of data files to distribute the divided divisional data files; and
    data transmitting means for transmitting each of the distributed divisional data files respectively through a predetermined transmission path,
    wherein the distributed divisional data files are stored in a private section of a respective transport stream; and
    wherein said distributed divisional data files can be restored into original data when a predetermined number of packets are removed by a data receiving apparatus from a group of packets generated by said data transmitting apparatus.

9. A data receiving apparatus for receiving predetermined data through transmission paths, the data receiving apparatus comprising:
    data receiving means for receiving a plurality of divisional data files transmitted through the plural predetermined transmission paths;
    data receiving control means for restoring the plurality of the received divisional data files into original data; and
    data output means for outputting the restored data,
    wherein the divisional data files are extracted from a private section of a transport stream; and
    wherein said divisional data files can be restored into original data when a predetermined number of packets are removed by said data receiving apparatus from a group of packets generated by a data transmitting apparatus.

10. A data transmission method for distributing predetermined data through transmission paths, the data transmission method comprising the steps of:
    inputting the predetermined data to divide the input data into a predetermined number of data files to generate divisional data files to transmit each of the divisional data files through a predetermined transmission path,
    storing the divisional data files in a private section of a respective transport stream;
    receiving each of the divisional data files transmitted through the predetermined transmission paths to restore the received divisional data files into original data to output the restored data;

extracting the divisional data files from the private section of the transport stream; and restoring said divisional data files into original data when a predetermined number of packets are removed from a group of packets.

11. A data transmission system for transmitting moving picture data files through transmission paths, the data transmission system comprising:

a data transmitting apparatus including data dividing means for dividing one moving picture data file into a plurality of divisional distribution data files which are restored to an original data file by synthesis, and data transmitting means for transmitting each of the divided divisional distribution data files to each of a plurality of transmission paths which are different from each other, wherein the data transmitting apparatus stores the divided divisional distribution data files in a private section of a respective transport stream; and a data receiving apparatus including data receiving means for receiving the plural divisional distribution data files from the plurality of the different transmission paths, and restoring means for synthesizing the plurality of the received divisional distribution data files to restore one moving picture data file, wherein the data receiving apparatus extracts the divisional distribution data files from the private section of the transport stream; and wherein said divisional distribution data files can be restored into original data when a predetermined number of packets are removed by said data receiving apparatus from a group of packets generated by said data transmitting apparatus.

12. A data transmitting apparatus for transmitting moving picture data files through transmission paths, the data transmitting apparatus comprising:

data dividing means for dividing one moving picture data file into a plurality of divisional distribution data files which are restored to an original data file by synthesis; and data transmitting means for transmitting each of the divided divisional distribution data files to each of a plurality of transmission paths which are different from each other, wherein the divided divisional distribution data files are stored in a private section of a respective transport stream; and wherein said divided divisional distribution data files can be restored into original data when a predetermined number of packets are removed by a data receiving apparatus from a group of packets generated by said data transmitting apparatus.

13. A data receiving apparatus for receiving moving picture data files through transmission paths, the data receiving apparatus comprising:

data receiving means for receiving, from each of a plurality of transmission paths which are different from each other, a plurality of divisional distribution data files which are restored to an original data file by synthesis; and restoring means for synthesizing the plurality of received divisional distribution data files to restore one moving picture data file, wherein the divisional distribution data files are extracted from a private section of a transport stream; and wherein said divisional distribution data files can be restored into original data when a predetermined number of packets are removed by said data receiving apparatus from a group of packets generated by a data transmitting apparatus.

14. A data transmission method for transmitting moving picture data files through transmission paths, the data transmission method comprising the steps of:

dividing one moving picture data file into a plurality of divisional distribution data files which are restored to an original data by synthesis;

storing the divided divisional distribution data files in a private section of a respective transport stream;

transmitting each of the divided divisional distribution data files to each of a plurality of transmission paths which are different from each other;

receiving the plurality of divisional distribution data files from the plurality of the different transmission paths;

extracting the divisional distribution data files from the private section of the transport stream;

synthesizing the plurality of the received divisional distribution data files to restore one moving picture data file; and restoring said divisional distribution data files into said moving picture data file when a predetermined number of packets are removed from a group of packets.

15. A data transmission system for transmitting movie contents files through satellite transponders, the data transmission system comprising:

a data transmitting apparatus including data dividing means for dividing one movie contents file into a plurality of divisional distribution data files which are restored to an original data file by synthesis, and data transmitting means for transmitting each of the divided divisional distribution data files to each of a plurality of satellite transponders which are different from each other, wherein the data transmitting apparatus stores the divided divisional distribution data files in a private section of a respective transport stream; and a data receiving apparatus including data receiving means for receiving the plurality of divisional distribution data files from the plurality of the different satellite transponders, and restoring means for synthesizing the plurality of the received divisional distribution data files to restore one movie contents file, wherein the data receiving apparatus extracts the divisional distribution data files from the private section of the transport stream; and wherein said divisional distribution data files can be restored into said movie contents file when a predetermined number of packets are removed by said data receiving apparatus from a group of packets generated by said data transmitting apparatus.

16. A data transmitting apparatus for transmitting movie contents files through satellite transponders, the data transmitting apparatus comprising:

data dividing means for dividing one movie contents file into a plurality of divisional distribution data files which are restored to an original data file by synthesis; and data transmitting means for transmitting each of the divided divisional distribution data files to a plurality of satellite transponders which are different from each other, wherein the divided divisional distribution data files are stored in a private section of a respective transport stream; and wherein said divided divisional distribution data files can be restored into said movie contents file when a predetermined number of packets are removed by a data receiving apparatus from a group of packets generated by said data transmitting apparatus.

17. A data receiving apparatus for receiving movie contents files through satellite transponders, the data receiving apparatus comprising:

data receiving means for receiving, from a plurality of different satellite transponders, a plurality of divisional distribution data files which are restored to an original data file by synthesis; and restoring means for synthesizing the plurality of received divisional distribution data files to restore one movie contents file, wherein the divisional distribution data files are extracted from a private section of a transport stream; and wherein said divisional distribution data files can be restored into said original data file when a predetermined number of packets are removed by said data receiving apparatus from a group of packets generated by a data transmitting apparatus.

18. A data transmission method for transmitting movie contents files through satellite transponders, the data transmission method comprising the steps of:

dividing one movie contents file into a plurality of divisional distribution data files which are restored to an original data file by synthesis;

storing the divided divisional distribution data files in a private section of a respective transport stream;

transmitting each of the divided divisional distribution data files to a plurality of satellite transponders which are different from each other;

receiving the plurality of divisional distribution data files from the different plural satellite transponders;

extracting the divisional distribution data files from the private section of the transport stream;

synthesizing the plurality of the received divisional distribution data files to restore one movie contents file;

storing said divisional distribution data files into said movie contents file when a predetermined number of packets are removed from a group of packets.

* * * * *